United States Patent [19]
Kautz et al.

[11] 3,754,650
[45] Aug. 28, 1973

[54] METHOD FOR THE DIALYSIS OF MILK, AND MORE PARTICULARLY METHOD FOR PRODUCING ALBUMIN FROM MILK AND WHEY, AND APPARATUS FOR CARRYING OUT THIS METHOD

[75] Inventors: Kurt Kautz; Otto Stahnke, both of Dahlenburg, Germany

[73] Assignee: Molkerergenossenschaft Dahlenburg EGmbH, Dahlenburg, Germany

[22] Filed: May 11, 1972

[21] Appl. No.: 252,307

Related U.S. Application Data
[62] Division of Ser. No. 94,642, Dec. 3, 1970.

[30] Foreign Application Priority Data
Jan. 23, 1970 Germany.................... P 20 02 985.0
Dec. 10, 1969 Germany.................... P 19 61 885.0

[52] U.S. Cl.................................. 210/152, 210/321

[51] Int. Cl............................................. B01d 31/00
[58] Field of Search........................ 99/57; 203/39; 210/22, 152, 321

[56] References Cited
UNITED STATES PATENTS
| | | | |
|---|---|---|---|
| 3,447,930 | 6/1969 | Francis ................................... | 99/57 |
| 2,970,106 | 1/1961 | Binning et al..................... | 203/39 X |
| 2,864,506 | 12/1958 | Hiskey.............................. | 210/22 X |

*Primary Examiner*—Frank A. Spear, Jr.
*Attorney*—David Toren et al.

[57] ABSTRACT

A method for producing albumin from milk and whey by the dialysis of skimmed milk or whey, wherein the skimmed milk or whey is concentrated prior to the dialysis, and an apparatus for carrying out this method, and comprising a dialytic device.

7 Claims, 5 Drawing Figures

Patented Aug. 28, 1973 3,754,650

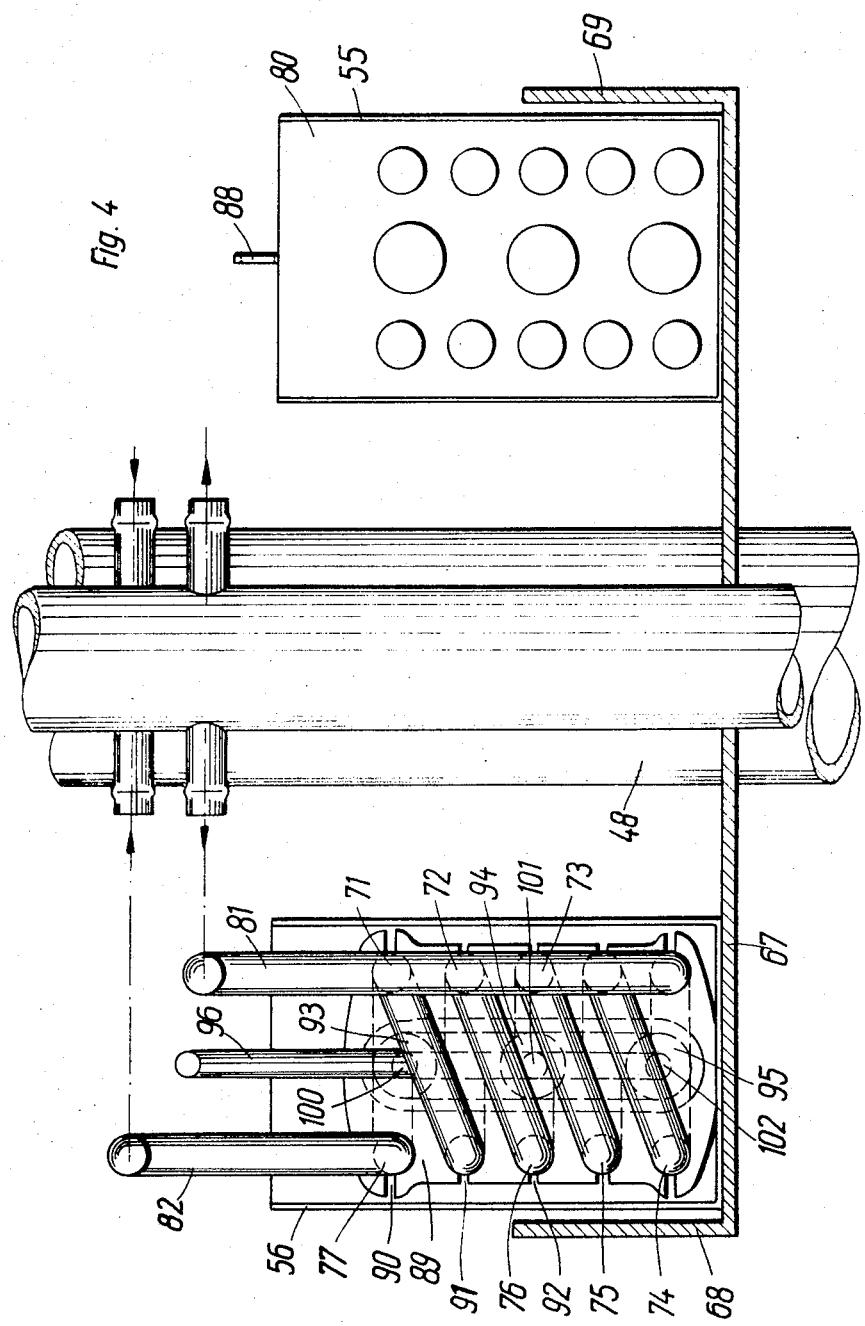

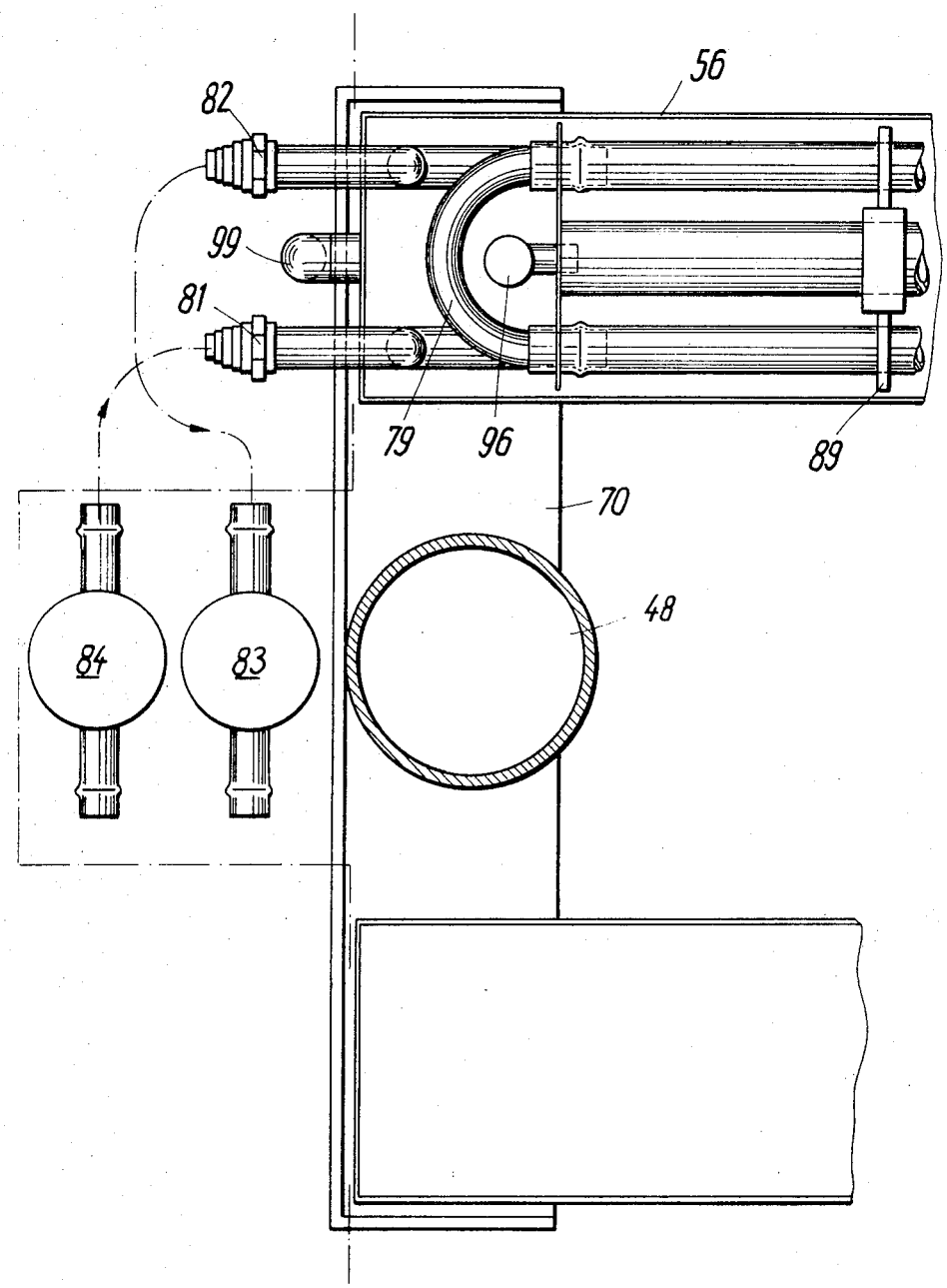

METHOD FOR THE DIALYSIS OF MILK, AND MORE PARTICULARLY METHOD FOR PRODUCING ALBUMIN FROM MILK AND WHEY, AND APPARATUS FOR CARRYING OUT THIS METHOD

This is a division of application Ser. No. 94,642 filed Dec. 3, 1970.

BACKGROUND OF THE INVENTION

The dialysis of milk is known for the separation of salts and sugars. This method operates very slowly and is therefore rather unecomomical. For this reason, the so-called electro-dialysis is carried out, affecting mainly the removal of the salts and to a lesser degree the content of milk sugar. The invention is preferably based on the use of ordinary dialysis.

In practice, dialysis yields two products. One of these products contains the albumin which is retained in its native form. This has a comparatively small proportion of salts and can be further processed as known in the art, for example, by spray drying. The other product is a dialysis water containing milk sugar and salts.

In known dialysis methods there is the disadvantage that a product is finally obtained which is strongly diluted with water. In addition, the known methods have the drawback of requiring continuously the addition of fresh water in order to keep the concentration of salt on the water side at a low level. This fresh water contains frequently additives and impurities, and even if these are not injurious to health, the end product will be impure.

In order to recover the sugar, the dialysis of milk can be carried out after homogenization at about 60°C. However, when this method is used, the dialysis must be carried out in a thin layer. The preceding homogenization reduces here the cleaning up to a minimum and supports the removal of sugar.

It is also known to concentrate milk, and particularly skimmed milk, prior to carrying out the dialysis.

SUMMARY OF THE INVENTION

Normally, all kinds of dialysis require much time. A certain acceleration of the method can be achieved by raising the temperature, but when the temperature becomes excessive, flocculation or denaturation of the proteins occurs. From this point of view, 40°C has been regarded as optimum temperature.

It is an object of the invention to provide a dialysis method for milk which is substantially more ecomomical than hitherto known methods, and which gives a result having a higher percentage of solids than a product obtained with normal dialysis or with electro-dialysis. The method also aims at an economical production of milk sugar and milk salts, and at providing a device which is particularly suitable for carrying out this method in an economical manner.

It is a further object of the invention to provide a method of the kind hereinbefore described in which the concentrate is subjected to a concentrating dialysis at substantially uniform temperature within the range of 40° to 70°C under conditions of alternating dialysis and concentration of the albumin products, wherein after the first concentration, substantially the same viscosity is maintained during the cycle. This means that, after the first concentration, at the start of the process step of the dialysis, a substantially uniform viscosity is maintained. In the following, this isothermic, isoviscous dialysis will be referred to as I—I dialysis.

Surprisingly, it has become apparent that, due to the cycle between dialysis and concentration provided for by this method, the dialysing speed was about twice as fast as hitherto, whilst simultaneously the milk is more carefully treated to obtain the albumin in its native state. In this method the dry matter content is reduced against the first concentration with an increasing albumin-to-sugar-salt ratio. During this, the albumin becomes increasingly more capable of swelling. It must be understood that the substantially isothermic concentrating dialysis may operate at a temperature which favors the economy of the method. However, the term "substantially" may include that the temperature during the concentration may be lower than during the dialysis. However, a practically constant temperature is preferred.

The substantially uniform viscosity results also in intermediate products of substantially uniform consistency, so that the conditions for all further processing steps are more favourable.

Preferably, the first concentration is effected to about 40–50 percent solid matter, and in the following cycle substantially the same viscosity is maintained, whilst alternatively dialysis and concentration are carried out until an end product with about 25–30 percent solid matter is obtained. Obviously, the method may also be carried out to a larger or smaller albumin content.

Without concentration, dialysis will yield a product with about 70 percent albumin at about 11–12 percent solid matter. This high water content may have a disadvantageous effect on subsequent treatment. By having about 70 percent albumin in 25–30 percent solid matter, the product may be used particularly for medical and cosmetic purposes, but is also more suitable for dietetic purposes.

Preferably, the concentration between individual dialysis steps is carried out as evaporation as a function of the increasing relative content of albumin in the solids, so as to maintain a substantially uniform viscosity.

It is a further object of the method according to the invention that, in order to maintain a substantially uniform viscosity, the concentration between dialysis steps is carried out as a function of a substantially uniform concentration of the albumin in the intermediate products. Thus, the invention makes possible the control either from the albumin content, or by virtue of a measurement of the viscosity. Furthermore, according to yet another embodiment, the method may be controlled as a function of the solid content.

For observing the substantially constant viscosity, there is the preferred possibility of an evaporation in a vacuum. The level of the vacuum will be governed by the temperature of the substantially isothermic concentrating dialysis, or by the water vapour pressure at this temperature. Particularly preferred is the latter embodiment because according to a special process step a thickening of an albumin product is effected in a vacuum, and the water of condensation is applied to the dialysis.

Preferably dialysis and evaporation are carried out at a temperature of substantially 58°C. It has been shown that in this case there does not occur any flocculation of the albumin under alternative dialysis and evaporation, and the albumin is maintained in its native state and capable of curdling with rennet. The uniform viscosity permits a uniform cycle because the conditions for recirculation remain uniform and at optimum level with regard to the mechanical equipment.

To improve the economy, also the dialysis water with salts and sugar is evaporated, and the water of condensation is returned to the dialysis. This produces more particularly a salt concentrate if the dialysis water enriched with sugar and salts, is supplied to an evaporator.

The return of the water of condensation of both dialysis products not only achieves the best utilization, but also prevents the introduction of foreign substances, such as are contained in the public water supply.

The invention includes that after the dialysis the products are thickened as well known in the art. The product containing the albumin may be sprayed under careful conditions. However, it is preferred to freeze dry this product after the I—I dialysis. If this product is powdered after the freeze drying, one obtains after the dialysis described above with continuous thickening, a denser and heavier powder which is more easily wetted than a powder resulting from an intermediate product produced by conventional methods of dialysis. This denser powder has not only the advantage of better wetting which has its effect in all applications relating to its solubility, but offers also economical advantages owing to more favourable conditions of transportation by having a smaller volume for a given weight.

The freeze drying leaves the albumin in its native form and produces simultaneously a structure which is particularly suitable for solution of further processing.

The resulting granulate or powder may be mixed with other, preferably particulate, food stuffs, medicines, cosmetic products and the like. According to a special feature of the invention, the product is mixed with milk in order to increase its albumin content.

According to a further preferred embodiment, the product of the dialysis is inoculated prior to the preeze drying, preferably by adding yoghurt cultures. This improves the possibilities for further processing. According to yet another feature, prior to the freeze drying, other substances from the field of food stuffs, dietetic agents, medicaments, and cosmetics are added to the product of the dialysis. In this manner it is possible to produce a product soluble in water or other liquid, which contains vitamins, food stuffs or spices, and is easily digested.

The I—I dialysis is therefore a new method which, by alternative treatment by dialysis and concentration, results in a substantial acceleration compared with known dialysis methods.

With regard to products rich in albumin it should be noted that albumin binds fat. After the separation of salts and sugar which do not bind fat, a further possible field of application is in the meat processing industries. Other applications are: bakery products, puddings, soups, desserts, and the like.

It is a further object of the invention to provide an apparatus for carrying out the method outlined hereinbefore, in which dialysing diaphragms are used in the form of hoses. In this case, the outlet of the dialysing apparatus is connected to an evaporator having one outlet for the concentrated product which is adapted to be connected with the inlet of the dialysing apparatus, and whose other outlet for the condensate may be connected through a conduit with the inlet for the dialysis water. This arrangement ensures the recovery and reuse of the condensate. According to a further feature, an outlet conduit for the dialysis water is adapted with the inlet for the dialysis water into the dialysing apparatus through an evaporator, the condensate of which is returned to a collecting tank for recirculating the dialysis water, whilst another outlet of the evaporator may be connected with a stacking container and a further processing stage for recovering the milk sugar.

Obviously, such a device will also be equipped with a pump which returns the product of the dialysis from the evaporator to the dialysing apparatus. According to a particular feature, however, a connecting conduit is provided between a feed tank for the dialysis product and a further processing device, whilst an ultra high heater is connected to the said further processing device.

According to the invention, the apparatus contains viscosity measuring instruments at the points of the installation where they are required.

Irrespective of these features, the invention provides that the dialysis apparatus consists of a frame to which are connected several trough shaped containers, each of which holds a group of hose conduits, and wherein connecting elements are provided at the end faces of the containers which connect the hose conduits successively, and which have substantially the shape of U-shaped pipe sections. In this manner, particularly large surfaces of dialysis diaphragms are available in the smallest possible space. Prefereably, several hose conduits are connected by two head pieces at the ends in parallel, and these groups can again be connected in series.

The term "milk" used in the following comprises also skimmed milk and whey.

DETAILED DESCRIPTION OF THE DRAWINGS

The invention will be further described, by way of example, with reference to an embodiment shown in the drawing. In the drawing:

FIG. 4 is an end elevation of a head piece of the dialysis apparatus in cross-section, showing on the left side a cross-section along the line IVa—IVa in FIG. 3, omitting the mounting and showing both the hose connectors and a mounting device for the hoses, and on the right side a mounting along the line IVb—IVb in FIG. 3;

FIG. 5 is a partial plan view of the arrangement of FIG. 4.

Figure 1:
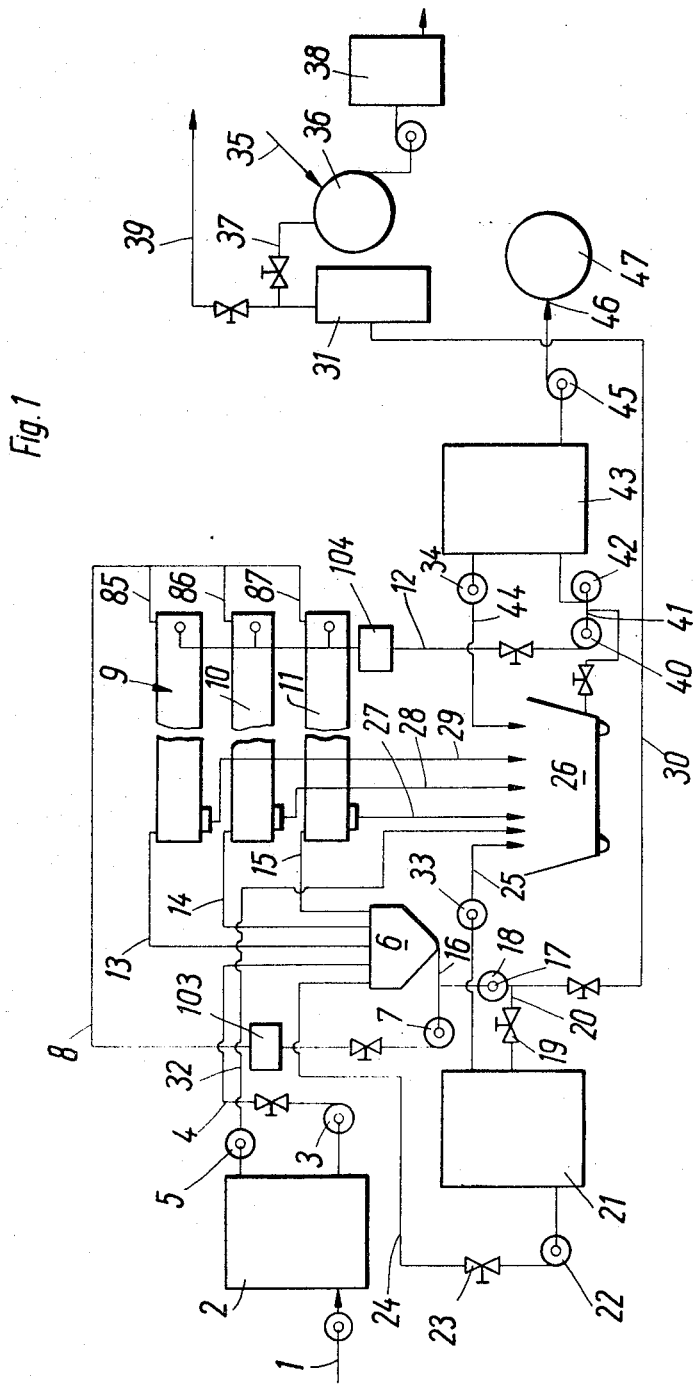
FIG. 1 shows a block diagram of a device for carrying out the method in accordance with the invention.

Where a pump is referred to in the following, it should be understood that this is a pump unit having valves upstream and downstream of the pump, which valves are not always shown in the drawing.

DETAILED DESCRIPTION OF THE PREFERRED EMBODIMENTS

Through the conduit 1, pasteurized milk is supplied to an evaporator 2, in which the milk is concentrated to about 40–50 percent dry substance. The resulting concentrate is delivered by a pump 3 through a conduit 4 into a feed tank 6 from which a pump 7 delivers the milk through a conduit 8 to dialysis apparatus 9, 10, 11. The milk flows back through the conduits 13, 14, and 15 to the feed tank 6 and is continuously pumped through the dialysis apparatus as described. During the dialysis, a part of the milk is applied by a pump 18 through a valve 19 to an evaporator 21, in order to adjust a certain solids content, and reaches as concentrate via a pump 22, a valve 23 and a conduit 24 again the feed tank 6.

The water necessary for the dialysis is collected in a tank 26. From this tank the water flows through a conduit 41 into a connecting conduit 97 between the pumps 40 to 42, and can be applied by the pump 40 through the conduit 12 to the dialysis apparatus 9, 10, 11. The water coming from the dialysis apparatus flows through conduits 27, 28, 29 back into the collecting tank 26, and is continuously pumped through the dialysis apparatus as described above. During the dialysis at least a part of the water containing sugar and salt is applied by the pump 42 to the evaporator 43. The resulting sugar-salt concentrate is delivered by a pump 45 and a conduit 46 into a storage tank 47.

The condensate obtained in the three evaporators 2, 21, 43 is again supplied to the collecting tank 26 through the pumps 5, 33, 34, and the conduits 25, 32, 44. Since there occurs during the dialysis a loss of dialysis water due to the migration of dialysis water through the diaphragm into the milk, and due to the continuous withdrawal of sugar-salt concentrate from the evaporator 43, the above described ultilization of the condensate from the evaporators 2, 21, 43 ensures a sufficient supply.

Furthermore, the product containing albumin in its native form may be supplied through pump 18, conduit 30, cooler 31 and collecting and milk tank 36 in which other substances may be admixed to an ultra high heating plant 38 with aseptic filling. On the other hand, the dialysis product may be supplied from the cooler 31 through the conduit 39 to other processing devices. The arrow 35 pointing to the collecting and milk tank 36 indicates a supply of milk, and more particularly of pasteurized milk. The conduits 8 and 12 which carry milk or dialysis water, pass through heat exchangers 103 and 104 in order to obtain the above mentioned temperature for carrying out the dialysis.

Figure 2:
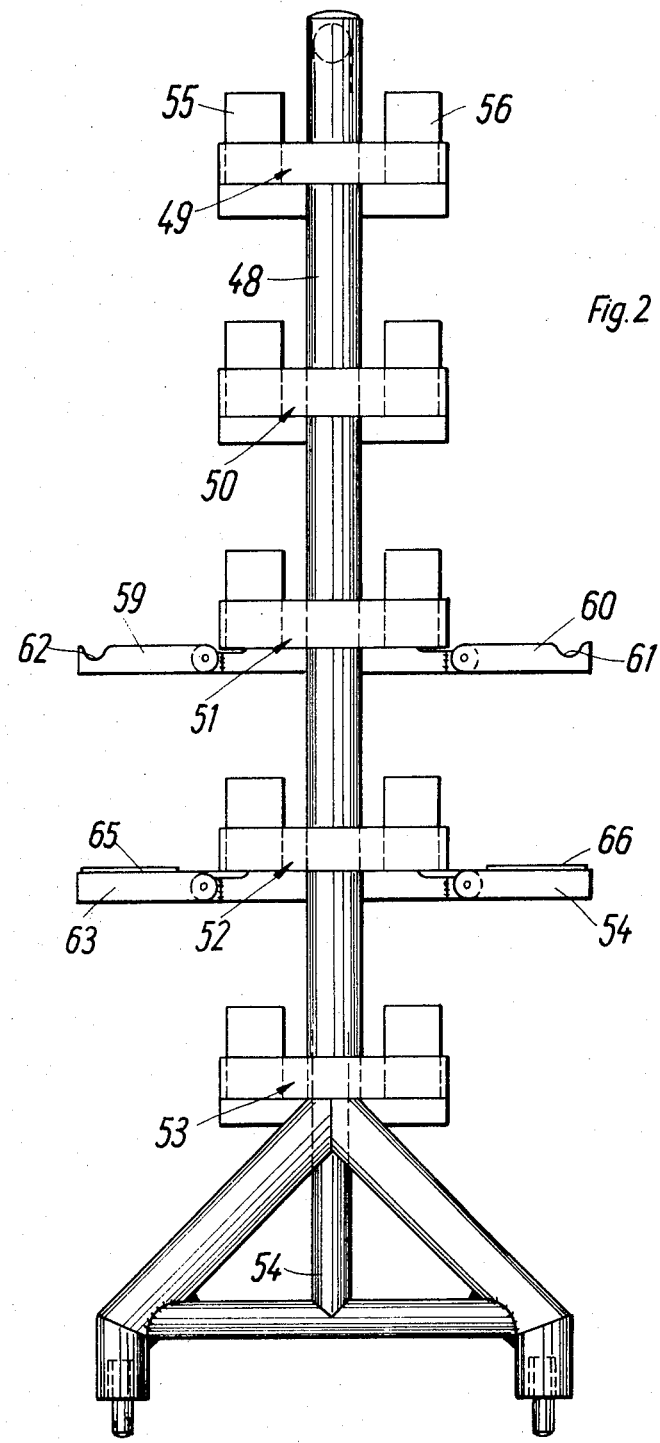
FIG. 2 is an end elevation of a dialysis apparatus suitable for use in FIG. 1.
Figure 3:
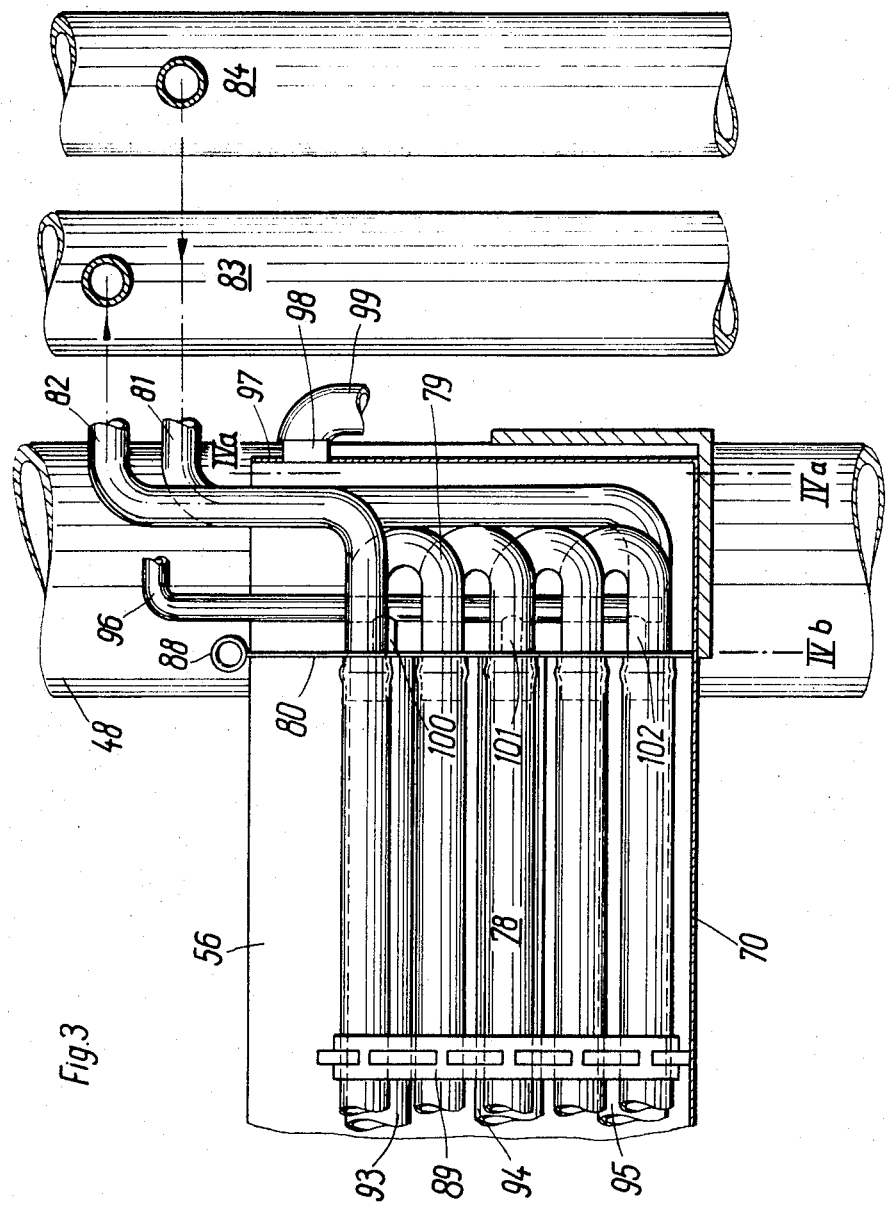
FIG. 3 is a side elevation of a head piece of a dialysis apparatus shown partially and in partial cross-section.

Of special importance for the economical application of milk dialysis is the arrangement of a large diaphragm surface on a narrow space. FIG. 2 to 4 show a special apparatus which may possibly also be multiplied by further parallel arrangements of corresponding devices.

FIGS. 2 to 4 show dialysis apparatus indicated generally at 9, 10 and 11. Following the diagrammatic arrangement of FIG. 1, three rows are shown, representing merely an exemplified embodiment. The actual dialysis apparatus consists of two end face frames 48 having lateral cross members 49, 50, 51, 52, 53 and at the bottom a wider base 54 to provide a stable foundation. In the embodiment of FIG. 2 the cross members 49 to 53 are only shown to receive each tank 55, 56 on either side of an end face column 48. Several containers may be provided which are adapted to receive groups of hoses. A cross member 51 has at its open ends outwardly hinged clips 59, 60 with hooks 61, 62 adapted to receive mountings provided on the groups of hoses, facilitating their exchange. The cross member 52 located thereunder has folding end sections 63, 64 with platforms 65, 66 which may receive containers 55, 56 with groups of hoses for exchange or maintenance purposes. It may be seen that the distance between the platform 65, 66 and the hooks 61, 62 is about twice as large as the height of a container 55, 56, so that when a mounting 80 is hooked in (FIG. 3) a unit with hoses 78 (FIG. 3) is freely accessible above the container.

FIGS. 3 and 4 show special embodiments. These figures again indicate the column 48. FIG. 4 shows a cross member 67 arranged in this zone and corresponding to one of the cross members 49 to 53 in FIG. 2, and having on each side containers 55, 56 within raised side flanges 68, 69. Such a container is shown in FIG. 3 at 56. The container 56 extends with its base 70 to another end face supporting structure, so that a trough shaped housing is formed in which hose conduits are arranged as shown in FIG. 4 at 71, 72, 73; 74, 75, 76; 77.

FIG. 3 shows that the hose conduits shown generally at 78 are fitted with their ends to connectors or tubular elements 79, the configuration of which may be seen from FIG. 4. The connectors extend with the head piece between planes in different heights. The topmost plane communicates with the connecting conduit 82 and the bottommost plane with the connecting conduit 81 leading to pipes 83, 84. The pipe 84 corresponds to the feed pipe 8 in FIG. 1, and the pipe 83 to the return conduits 13 to 15 in FIG. 1. At the other end of the hose group 78, the connecting elements 79 are associated with corresponding connecting elements but these are always arranged in one and the same plane.

FIG. 4 also shows that there are always provided groups of ten hoses, providing a large diaphragm area in a small space.

The connecting elements 79 are arranged in a mounting which also carries a supporting element 88. This supporting element serves to arrange a group with hoses in a special device of the apparatus for carrying out repairs. This device comprises the said hooks 61, 62 into which the supporting elements may engage, as well as the platform 65, 66.

Between their ends, the hose conduits 78 are equipped with holding elements 89, serving as spacers. These spacers which are arranged in FIG. 1 over the whole length of the devices 9 to 11 have the purpose of preventing contact between the hoses. The holding arrangement 89 and the mounting 80 are arranged in the containers 55, 56. The outer dimensions of the holding arrangement and of the mounting are such that they provide a support on the base and on the walls of the container. The holding arrangement 89 has circular holes arranged one below the other near the long edges, and having outwardly directed slots 90, 91, 92 . . . . Through these slots, the compressible hoses may be inserted into the holes and withdrawn therefrom.

Between the hoses there are arranged also in the center part of the holding arrangement tubes 93, 94, 95 passing therethrough which give the unit strength over its length and which receive dialysis water through a conduit 96 (shown in FIG. 1 at 12). Obviously, measures must be taken to enable the parts with the hoses 78 and the tube sections 79 and with the connecting conduits 81, 82, and the conduit 96, to be separated from other parts of the installation in the zone of the head pieces, and more particularly the mounting 80. These measures may comprise, for example, pipe connectors mounted on the connecting conduits 81, 82, and on the conduit 96, and fixed in the mounting 80.

The pipes 93 to 95 terminate in front of the other end wall of the container 56, not shown in FIG. 3. The dialysis water introduced flows therefrom from the pipes 93 to 95 at the other end of the container than that shown in FIG. 3, and flows back through the container to an overflow socket 98 arranged in the end wall 97 and connected to a hose 99. This hose 99 corresponds practically to the conduits 27, 28, 29 in FIG. 1.

It should also be pointed out that the conduit 96 communicates with comparatively short branching sockets 100, 101, 102 which extend with a certain clearance into the pipes 93 to 95. This arrangement achieves a uniform supply of the container 56 with dialysis water.

By providing several holding arrangements 89 over the whole length of the devices 9 to 11 (FIG. 1) intermediate contact is avoided and good flow is possible over the whole surface of the diaphragm. The arrangement of the tubes 93 to 95 results, on the one hand, in a rigid frame for the unit with the hose conduits 78 and provides, on the other hand, the possibility that the supply and the discharge of dialysis water may be carried out on the same side as the container, whilst dialysis water of the same quality is available over the whole length of the container 56.

FIG. 3 also indicates that the hose conduits 78 pass through holding arrangement 89, which provides a spacing over the length such as it appears from the arrangement shown in FIG. 4. This spacing over the lengths of the parts 9 to 11 is essential if contact between the hose elements is to be avoided.

FIG. 5 shows the relative arrangement of the parts 48, 56, 70, 79, 81, 82, 83, 84, 89, 96, and 99 in order to clarify their relationship.

We claim:

1. An apparatus for carrying out the dialysis of one of the substances comprising skimmed milk and whey, comprising a first concentrating means in which said substance is concentrated, a dialysis device, said dialysis device having an inlet means and an outlet means for said substance, first conduit means between said first concentrating means and said inlet means of said dialysis device through which concentrated substance is fed from said first concentrating means to said dialysis device, a second concentrating means having an inlet and an outlet, second conduit means between said outlet means of said dialysis device and said inlet on said second concentrating means, third conduit means between said outlet on said second concentrating means and said first conduit means for recirculating at least part of said dialyzed substance through said second concentrating means and returning said recirculated substance to said inlet means of said dialysis device, and fourth conduit means connected to said second conduit means for carrying away said substance after the latter has been recirculated through said dialysis device.

2. An apparatus as set forth in claim 1 wherein said first and second conduit means comprises a feed tank, said first conduit means having a first portion between said first concentrating means and said feed tank and a second portion between the latter and said inlet means of said dialysis device, said second conduit means having a first section between said outlet means of said dialysis device and said feed tank and a second section between the latter and said inlet of said second concentrating means, said third conduit means having a conduit element extending between the outlet of said second concentrating means and said feed tank.

3. An apparatus as set forth in claim 2 wherein said first and second concentrating means are evaporators, and wherein a storage means is provided for receiving dialysis water from said dialysis device, conduits between said dialysis device and said storage means for conducting said dialysis water to said storage means, fourth conduit means between said storage means and said dialysis device for feeding water from said storage means to said dialysis device, and conduits between said first concentrating means and said storage means and between said second concentrating means and said storage means for returning condensate to said storage means.

4. An apparatus as set forth in claim 3, further including a third evaporator, fifth conduit means for conducting fluid from said storage means to said third evaporator, and a conduit for returning condensate from said third evaporator to said storage means.

5. An apparatus as set forth in claim 4, including a storage tank, and control means associated with said fifth conduit means for controlling the flow of fluid from said feed tank to said storage tank for further processing.

6. An apparatus as set forth in claim 1, in which said dialysis device comprises a plurality of trough-shaped containers, each container containing a group of hose conduits, said containers having end faces which are provided with connecting elements which connect said groups of hose conduits in each container successively, said connecting elements having substantially the shape of U-shaped pipe elements, wherein one end of a hose conduit of each group of hose conduits forms a first inlet means and a said first outlet means, a mounting means with supporting elements between the individual hose conduits, connecting elements, and the inlet and outlet means, said connecting elements being arranged on said mounting means, said inlet and outlet means being adapted to be detached from the group of hose conduits from parts located outside the dialysing device, wherein further mounting devices are provided over the length of the hose conduits having near their edges circular holes for receiving the hose conduits, and slots extending from these holes towards the outside, through which the hose conduits can be inserted and removed.

7. An apparatus as set forth in claim 6, wherein said further mounting devices have perforated pipes extending over the length of the hose conduit and acting as supporting elements which receive the dialysis water.

* * * * *